(12) United States Patent
Lin et al.

(10) Patent No.: US 7,020,382 B2
(45) Date of Patent: Mar. 28, 2006

(54) MODIFYING VIDEO BY INSERTING SHADOW INTRA PICTURES

(75) Inventors: Shu Lin, Indianapolis, IN (US); Yongmei Cang, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1203 days.

(21) Appl. No.: 09/904,164

(22) Filed: Jul. 12, 2001

(65) Prior Publication Data
US 2003/0012552 A1  Jan. 16, 2003

(51) Int. Cl.
*H04N 5/91* (2006.01)
*H04N 7/26* (2006.01)

(52) U.S. Cl. ......................................... 386/68; 386/111
(58) Field of Classification Search .................. 386/68, 386/111, 109, 112, 1, 6, 27, 33, 60, 65, 69, 386/70, 125; H04N 5/91, 7/26
See application file for complete search history.

(56) References Cited

U.S. PATENT DOCUMENTS

| | | | | |
|---|---|---|---|---|
| 5,377,051 A | * | 12/1994 | Lane et al. | ................... 386/81 |
| 6,192,186 B1 | * | 2/2001 | Murashima et al. | .......... 386/68 |
| 2002/0044760 A1 | * | 4/2002 | Shirakawa et al. | ........... 386/65 |

* cited by examiner

*Primary Examiner*—Robert Chevalier
(74) *Attorney, Agent, or Firm*—Joseph S. Tripoli; Robert B. Levy; Jorge T. Villabon

(57) ABSTRACT

The invention includes a system (100) and a method (200) for recording onto a storage medium (112) a video segment optimized for trick mode playback. The method can include the steps of: receiving (210) the video segment in which the video segment can contain at least one predictive picture; selectively forming (218) at least one shadow intro picture from at least one predictive picture; and inserting (222) at least one shadow intra picture into the video segment. Moreover, the shadow intra pictures can be ignored (236) during normal playback or a moderate speed trick mode playback.

23 Claims, 2 Drawing Sheets

MODIFYING VIDEO BY INSERTING SHADOW INTRA PICTURES

BACKGROUND OF THE INVENTION

1. Technical Field

The inventive arrangements relate generally to video recording systems and more particularly to video recording systems that record digitally encoded video sequences onto disc media such as recordable digital video discs, hard drives and magneto optical discs.

2. Description of Related Art

MPEG video generally uses three types of picture coding methods: Intra (I) pictures, predictive (P) pictures and bidirectional predictive (B) pictures. I pictures are encoded or decoded independently of any other picture. This creates a reference picture from which P and B pictures, or non-I pictures, can be constructed.

A number of MPEG video signals, however, are encoded without I pictures. In particular, many U.S. cable systems broadcast MPEG signals that do not contain I pictures. At first glance, such a video signal appears impossible to decode since there are no I pictures from which to construct the P and B pictures.

Nevertheless, a video signal without any I pictures can be decoded by most MPEG decoders because a separate portion of each P picture in the signal is typically composed of I macroblocks. That is, successive P pictures containing I macroblocks can be used to eventually properly decode a P picture, which can then be used to decode the remaining pictures in the video signal. As an example, in a block of five P pictures, twenty percent of each P picture can contain I macroblocks. For example, the top twenty percent of the first P picture can be composed of I macroblocks and the lower eighty percent can be composed of non-I macroblocks. Referring to the second P picture in the video signal, the portion representing the twenty percent of the picture immediately below the top twenty percent can comprise I macroblocks while the lower sixty percent and the top twenty percent can be composed of non-I macroblocks. Thus, a different portion of each successive P picture contain I macroblocks. Hence, the bottom twenty percent of the last P picture can contain I macroblocks.

These I macroblocks, along with the non-I macroblocks contained in the P pictures, can be used to assemble each successive P picture. Specifically, as each P picture is decoded, the I and non-I macroblocks can be stored in memory. As such, the decoder can generally properly decode the fifth P picture, from which the remaining P and B pictures can be decoded.

During normal playback of a video signal having no I pictures, there is a brief period in which the picture quality suffers at the initiation of the playback. This is because the pictures at the beginning of the playback must be constructed from the P pictures that are not yet properly decoded. As an example, the first P picture in the playback signal normally contains the first portion of I macroblocks. Thus, the P and B pictures that are constructed from the first P picture cannot be properly decoded, as the first P picture contains only roughly twenty percent of the information needed to produce these pictures. As the playback continues, however, the picture quality improves since more of the P pictures are decoded thereby providing a greater number of correctly decoded I and non-I macroblocks until a properly decoded P picture is acquired. This initial reduction in picture quality is acceptable since it is brief, as a properly decoded picture is usually constructed within the first one-half second of normal playback of the video.

Significantly, however, the delay in building a properly decoded P picture in a signal lacking I pictures may be prolonged during a trick mode. As an example, during a fast-forward trick mode, a plurality of pictures are skipped to speed up the playback. If P pictures containing the I macroblocks are skipped, then it will take longer to properly decode a P picture for decoding the remaining P and B pictures. As a result, a greater number of pictures constructed during the trick mode will suffer from a degradation in picture quality. Additionally, the delay in producing an acceptable playback increases for a faster playback speed, as a greater number of P pictures may be skipped to accommodate the faster playback. Slow motion playback can contribute to a longer delay in producing the properly decoded P picture as well. This is because pictures are typically repeated during slow motion playback. Since pictures are being repeated, it will take longer to obtain a properly decoded P picture since there will be a delay in decoding the macroblocks from the five separate P pictures. As a result, the acceptable reduction in picture quality during normal playback may become unacceptable during trick mode operation. Thus, a need exists for a method and system of recording a video segment optimized for trick mode playback that overcomes the detriments described above.

SUMMARY OF THE INVENTION

The invention includes a method of recording onto a storage medium a video segment optimized for trick mode playback. The invention includes the steps of: receiving the video segment, wherein the video segment contains at least one predictive picture; selectively forming at least one shadow intra picture from at least one predictive picture; and inserting at least one shadow intra picture into the video segment. In one arrangement, the video segment can contain a first portion of video and a second portion of video, and the second portion of video can contain at least one introductory predictive picture. Additionally, the forming step can further include the step of selectively decoding a predetermined number of the introductory predictive pictures in the second portion of video to obtain a properly decoded predictive picture. Also, a portion of each introductory predictive picture can contain intra macroblocks, and the predetermined number can be based in part on the amount of intra macroblocks in each introductory predictive picture.

In another arrangement, the second portion of video can contain at least one subsequent predictive picture, and the forming step can further include the steps of: selectively decoding the subsequent predictive pictures; and selectively re-encoding into shadow intra pictures predictive pictures selected from the group comprising the subsequent predictive pictures or the introductory predictive pictures. In another aspect of the above method, the inserting step can further include the step of inserting at least one shadow intra picture into the first portion of video. Additionally, the invention can include the step of ignoring the shadow intra pictures during normal playback. In addition, the shadow I picture can be ignored during a moderate speed trick mode playback.

The invention can also include a system for recording onto a storage medium a video segment optimized for trick mode playback. The system can include a receiver for receiving a video segment in which the video segment contains at least one predictive picture; and a video processor programmed to selectively form at least one shadow intra picture from at least one predictive picture. In addition, the video processor can be further programmed to insert at least one shadow intra picture into the video segment. The system also includes suitable software and circuitry to implement the methods as described above.

DETAILED DESCRIPTION OF THE PREFERRED EMBODIMENTS

Recordable Storage Medium Device

Figure 1:
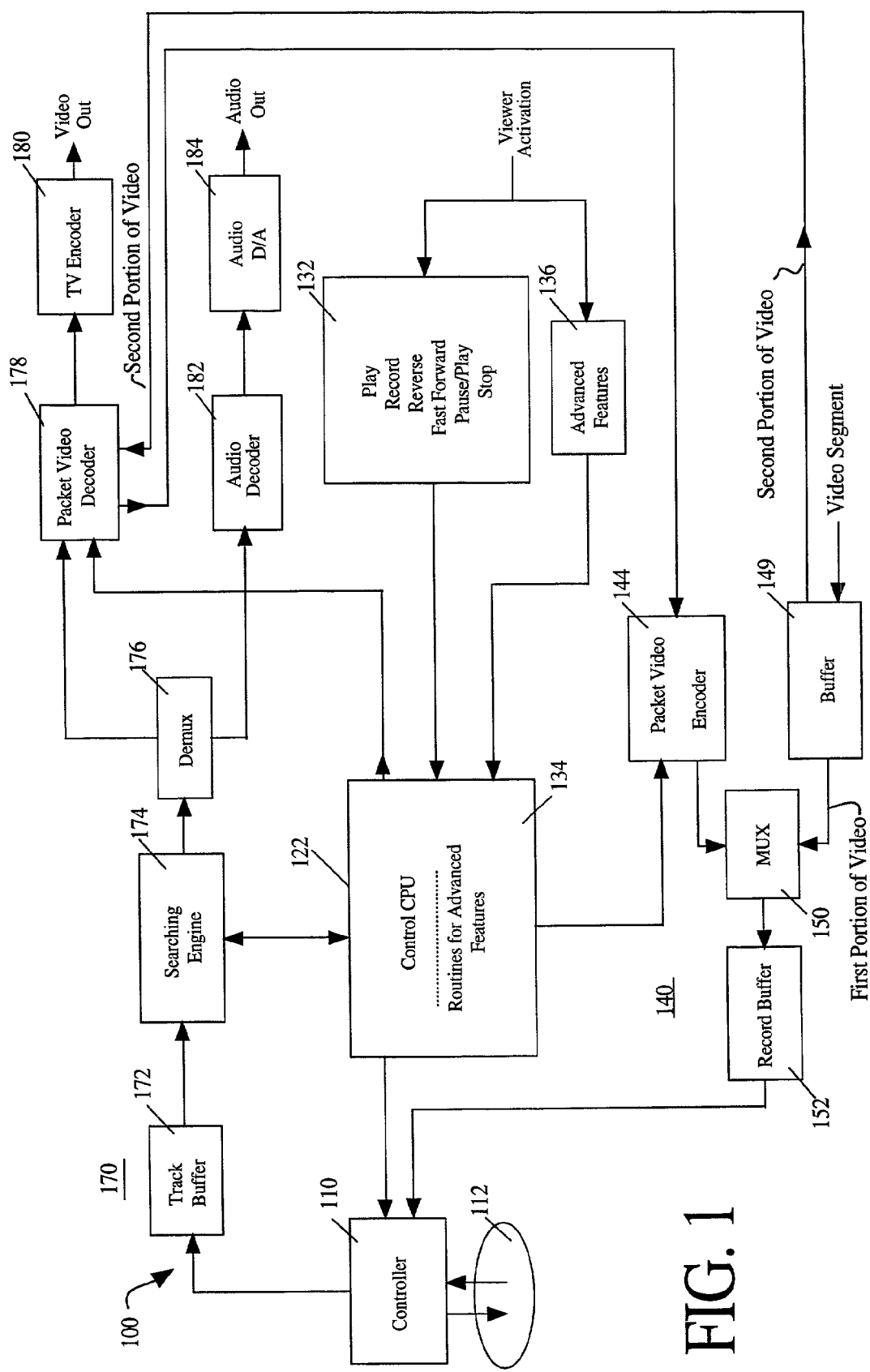
FIG. 1 is a block diagram of a storage medium device that can modify video by inserting shadow intra pictures in accordance with the inventive arrangements herein.

A storage medium device 100 for implementing the various advanced operating features in accordance with the inventive arrangements is shown in block diagram form in FIG. 1. The invention, however, is not limited to the particular device illustrated in FIG. 1, as the invention can be practiced with any other storage medium device capable of receiving a digitally encoded signal. In addition, the device 100 is not limited to reading data from or writing data to any particular type of storage medium, as any storage medium capable of storing digitally encoded data can be used with the device 100.

The device 100 can comprise an input processing path 140 and an output processing path 170. Further the device 100 can include a controller 110 for reading data from and writing data to a storage medium 112. The device 100 can also have a control central processing unit (CPU) 122. Control and data interfaces can also be provided for permitting the control CPU 122 to control the operation of a packet video encoder 144, a packet video decoder 178, an audio decoder 182, a searching engine 174 and the controller 10. Suitable software or firmware can be provided in memory for the conventional operations performed by control CPU 122. Further, program routines for the editing recorded video features 134 are provided for controlling CPU 122 in accordance with the inventive arrangements.

A control buffer 132 for viewer activatable functions can indicate those functions presently available, namely play, record, reverse, fast forward, slow play, jump, pause/play and stop. In addition, advanced features, depicted by block 136, can be provided to receive commands for implementing recorded video editing features.

The output processing path 170 can include a track buffer 172, the pre-processing engine 174, a demultiplexer 176, the packet video decoder 178, a TV encoder 180, the audio decoder 182 and an audio D/A 184. The track buffer 172 can read and temporarily store for further processing data read from the storage medium 112. The data can be sent to the demultiplexer 176 where it can be divided into respective paths for video and audio processing. The searching engine 174 can process data read from the storage medium 112 by locating pictures in the data read from the medium 112. The pre-processing engine 174 can locate pictures in the data by locating each picture's start code. Once a start code is located, the searching engine 174 can signal the control CPU 122. The control CPU 122 can then determine whether the picture is an I, B or P picture by focusing on that particular picture's start code. In this arrangement, the control CPU 122 can then signal the packet video decoder 178 to refrain from decoding a particular picture thus preventing that picture from being displayed. It should be understood that all or portions of the control CPU 122, the searching engine 174, the decoder 178 and the encoder 144 can be considered a video processor 190 within contemplation of the present invention.

In accordance with the inventive arrangements, one or more shadow I pictures can be inserted into a digitally encoded video signal. A shadow I picture is an I picture that can be used to construct other pictures in a recorded video signal during severe trick mode playback but can be ignored during normal or moderate speed trick mode playback. In one arrangement, the shadow I pictures can be inserted into a digitally encoded signal that does not contain any I pictures; however, the invention is not so limited, as shadow I pictures can be inserted into video signals that have conventional I pictures. As will be explained below, one or more pictures in such a signal can be re-encoded into a shadow I picture. In this arrangement, a video segment into which shadow I pictures are to be inserted can be received by a receiver or buffer 149. The video segment can be comprised of a first portion of video and a second portion of video in which the first portion of video can receive the shadow I pictures, and the second portion of video can be used to create the shadow I pictures. In one arrangement, the second portion of video can contain one or more pictures from the first video signal.

The second portion of video can be received by the packet video decoder 178. One or more of the pictures in the second portion of video can be selectively decoded by the decoder 178 to create a properly decoded picture, which can then be used to decode selectively the other pictures in the second video signal. The second video signal can then be sent to the packet video encoder 144. The pictures in the second portion of video that were selectively decoded by the decoder 178 can be used by the encoder 144 to create one or more shadow I pictures by selectively re-encoding such pictures into shadow I pictures.

Once the shadow I pictures are formed, the remaining pictures that were not re-encoded into shadow I pictures can be discarded. The shadow I pictures in the second portion of video can then be combined with the first portion of video in a multiplexer (MUX) 150 thereby modifying the original video segment. The modified video segment can then be stored in a record buffer 152 until it can be recorded onto the storage medium 112. Thus, the video segment can be modified by adding to it one or more shadow I pictures. This process will be explained in greater detail below.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

Modifying Video by Inserting Shadow Intra Pictures

According to the inventive arrangements, the poor picture quality associated with trick mode playback of recorded video not having I pictures can be improved by forming one or more shadow I pictures from one or more P pictures contained in the original video signal. These shadow I pictures can then be inserted into the video signal as the video signal is recorded and can be used to reconstruct the non-intra pictures contained in the video during a severe trick mode playback of the recorded video. Notably, however, these shadow I pictures can be ignored during normal playback, or a less severe trick mode playback, so as not to interfere with the original broadcast structure.

Figure 2:
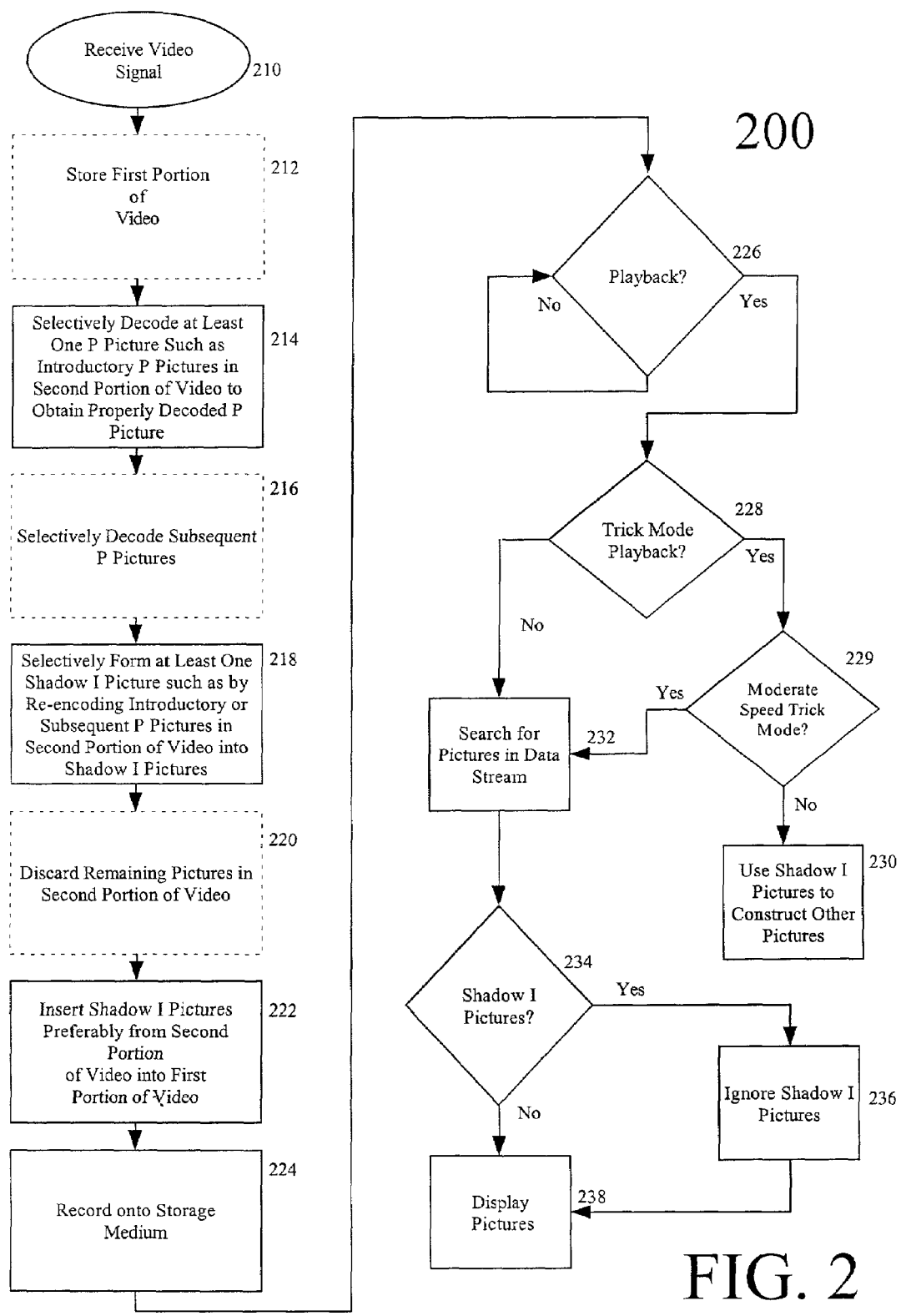
FIG. 2 is a flow chart that illustrates the operation of modifying video by inserting shadow intra pictures in accordance with the inventive arrangements herein.

FIG. 2 illustrates a flowchart 200 that demonstrates one way in which video containing P pictures with I macroblocks—typically, a signal with no I pictures—can be modified for optimal trick mode performance. At step 210, a video signal containing at least one P picture can be received. As noted earlier, many video broadcast signals, particularly U.S. cable transmissions, do not contain I pictures. Many of these signals are made up of a number of video sequences containing a predetermined number of non-I pictures. The following is an example of a typical video sequence contained in such a signal:

SH $B_0$ $B_1$ $P_2$ $B_3$ $B_4$ $P_5$ $B_6$ $B_7$ $P_8$ $B_9$ $B_{10}$ $P_{11}$ $B_{12}$ $B_{13}$ $B_{14}$

As shown, the example contains only non-intra pictures (P and B pictures) and does not contain any I pictures. A portion of each P picture is typically encoded with I macroblocks. During normal playback, the pictures in the sequence can be constructed from the macroblocks, both I and non-I macroblocks, in the P pictures. Experience has shown that encoding approximately twenty percent of each P picture with I macroblocks and placing two B pictures between P pictures works well. Accordingly, the typical sequence as shown above is commonly used and will be used to help explain the invention. Those skilled in the art, however, will appreciate that other video sequences lacking I pictures are also commonly used and may be considered typical. In fact, any video sequence that contains at least one P picture can be modified in accordance with the inventive arrangements; this includes video signals that contain I pictures.

The pictures in the typical video sequence shown above can represent progressive frames, non-progressive frames or field pictures, as the invention is not limited to any particular picture format. The symbol "SH" stands for sequence header, which is a header that contains decoding information about the particular video sequence to which it is assigned. It should be noted, however, that the invention is not limited to such an arrangement, as the invention can be practiced with video sequences that do not have sequence headers.

At step 212, the received video signal can be temporarily stored as a first portion of video. The following represents an example of a first portion of video which contains two typical video sequences:

$SH_1$ $B_0$ $B_1$ $P_2$ $B_3$ $B_4$ $P_5$ $B_6$ $B_7$ $P_8$ $B_9$ $B_{10}$ $P_{11}$ $B_{12}$ $B_{13}$ $B_{14}$
$SH_2$ $B_{15}$ $B_{16}$ $P_{17}$ $B_{18}$ $B_{19}$ $P_{20}$ $B_{21}$ $B_{22}$ $P_{23}$ $B_{24}$ $B_{25}$ $P_{26}$ $B_{27}$ $B_{28}$ $P_{29}$

It should be noted that this is merely an example of a first portion of video, as such a portion can contain any amount of video and is not limited to these particular types of video sequences. A second portion of video containing one or more of the pictures from the first portion of video can be selectively decoded to obtain a properly decoded picture, as shown in step 214. In one arrangement, the second portion of video can contain all the non-I pictures from the first portion of video or, alternatively, all the P pictures. In either arrangement, one or more of the P pictures in the second portion of video can be decoded until a properly decoded P picture is obtained. For purposes of explaining the invention, however, in this example, the second portion of video will contain all the pictures shown in the two typical video sequences from the first portion of video.

In one embodiment, the number of the P pictures in the second portion of video to be decoded can depend on the amount of I macroblocks in the P pictures. As an example, the five P pictures in the first video sequence reproduced above—$P_2$, $P_5$, $P_8$, $P_{11}$ and $P_{14}$—can be decoded, which can result in picture $P_{14}$ being properly decoded. As discussed earlier, five P pictures can be used to properly decode a P picture because generally a separate portion (approximately twenty percent) of each P picture in the typical video sequence is comprised of I macroblocks. It should be noted, however, that the invention is not limited to the preceding example, as any other suitable number of P pictures can be decoded for purposes of obtaining a properly decoded P picture. For instance, these initial P pictures can contain different percentages of I macroblocks. For purposes of clarity, the P pictures used to obtain the properly decoded P picture can be referred to as introductory P pictures.

Once a properly decoded P picture is obtained from decoding the introductory P pictures in the second portion of video, the properly decoded P picture can be used to decode selectively one or more subsequent P pictures in the second portion of video, as shown in step 216. For example, continuing with the video sequences shown above, once picture $P_{14}$ is properly decoded, the P pictures in the next video sequence—$P_{17}$, $P_{20}$, $P_{23}$, $P_{26}$ and $P_{29}$—can be properly decoded as well. In one arrangement, it is preferable that all the subsequent P pictures in the second portion of video be decoded; however, the invention is not limited in this regard, as any other suitable number of subsequent P pictures can be decoded.

In another arrangement, if one or more P pictures are skipped once a properly decoded P pictures is acquired, i.e., less than all the P pictures in the second portion of video are decoded, one or more P pictures following the skipped P picture(s) can be used to create another properly decoded P picture for purposes of decoding the subsequent P pictures. The P pictures following the skipped P picture that are used to construct another properly decoded P picture can be referred to as introductory P pictures as well.

At step 218, once the desired number of subsequent P pictures are decoded, one or more of the selectively decoded subsequent P pictures can be re-encoded into a shadow I picture. In addition, one or more of the introductory P pictures can be re-encoded into a shadow I picture. The following is an example of such a process:

$SH_1\ B_0\ B_1\ I_2\ B_3\ B_4\ P_5\ B_6\ B_7\ P_8\ B_9\ B_{10}\ P_{11}\ B_{12}\ B_{13}\ P_{14}$
$SH_2\ B_{15}\ B_{16}\ I_{17}\ B_{18}\ B_{19}\ P_{20}\ B_{21}\ B_{22}\ P_{23}\ B_{24}\ B_{25}\ P_{26}\ B_{27}\ B_{28}\ P_{29}$

As shown, pictures $P_2$ and $P_{17}$ have been re-encoded into shadow I pictures $I_2$ and $I_{17}$ respectively. It should be noted that the invention is not limited to this particular example or any particular re-encoding algorithm, as any number of introductory or subsequent P pictures can be re-encoded into a shadow I picture.

For example, pictures $P_5$ and $P_{20}$ from the above video sequences, in addition to pictures $P_2$ and $P_{17}$, could also be re-encoded into shadow I pictures.

In one arrangement, during the re-encoding step, the number of bits contained in the shadow I pictures can be reduced. Lowering the number of bits contained in the shadow I pictures can reduce the picture quality; however, this reduction in picture quality is acceptable for purposes of trick mode playback, and shadow I pictures containing a reduced number of bits require less storage space and/or bandwidth.

After the shadow I pictures have been formed, the remaining pictures in the second portion of video—the pictures that were not selectively re-encoded into shadow I pictures—can be discarded, as shown in step 220. Thus, in the above example, the only pictures that would remain after step 220 would be $I_2$ and $I_{17}$. At step 222, the shadow I pictures in the second portion of video can be inserted into the first portion of video. The shadow I pictures can be inserted in any suitable location in the first portion of video and at any suitable frequency. In one arrangement, the second portion of video can contain all the pictures from the first portion of video. In that case, the video sequences in the second portion of video correspond to the video sequences in the first portion of video. If a shadow I picture is created from each video sequence in the second portion of video, then each shadow I picture can be inserted into its corresponding video sequence in the first portion of video. The following shows an example of adding the shadow I pictures from the second portion of video to their corresponding video sequences contained in the first portion of video:

$SH_1\ B_0\ B_1\ P_2\ I_2\ B_3\ B_4\ P_5\ B_6\ B_7\ P_8\ B_9\ B_{10}\ P_{11}\ B_{12}\ B_{13}\ P_{14}$
$SH_2\ B_{15}\ B_{16}\ P_{17}\ I_{17}\ B_{18}\ B_{19}\ P_{20}\ B_{21}\ B_{22}\ P_{23}\ B_{24}\ B_{25}\ P_{26}\ B_{27}\ B_{28}\ P_{29}$

As shown, pictures $I_2$ and $I_{17}$ from the video sequences in the second portion of video have been inserted into their corresponding video sequences contained in the first portion of video. Although the pictures $I_2$ and $I_{17}$ were inserted next to pictures $P_2$ and $P_{17}$ respectively, it should be noted that the invention is not limited to this particular example. In fact, each shadow I picture can be inserted anywhere in its corresponding video sequence or any other video sequence in the first video segment.

The modified first video segment can then be recorded onto a storage medium, as shown at step 224. Although it is desirable to store the shadow I pictures on the storage medium in the same location as the modified video segment, the shadow I pictures can be stored at any suitable location on the storage medium.

This modification can permit the first video segment—the original incoming video—to have shadow I pictures inserted into it from which the non-intra pictures can be constructed during trick mode playback. As such, this process of adding shadow I pictures improves the picture quality during a trick mode, as the pictures in the modified video segment no longer depend on a plurality of P pictures to be decoded.

Once recorded onto the storage medium, the modified first video segment can be played back. If playback is initiated at step 226, then a determination is made at step 228 as to whether the playback is a trick mode. If the playback is a trick mode, then the shadow I pictures in the modified video segment can be used to construct the other pictures in the modified segment, as shown in step 230. If the playback is a normal playback, then the shadow I pictures can be ignored, as shown in steps 232 through 238.

In another arrangement, if the speed of a fast-motion trick mode playback does not excessively deviate from the speed of normal playback, as may be decided at decision block 229, then only the B pictures in the signal read from the storage medium need to be skipped during the trick mode, and the I macroblock encoded P pictures in the signal can be used to construct the pictures in the signal, and the process can continue as previously explained with respect to steps 232–238. Similar to normal playback, the shadow I pictures can be ignored during less severe, fast-motion trick mode speeds. As an example, referring once again to the typical video sequences discussed above, up to ten B pictures could be skipped in one video sequence before the P pictures would have to be skipped during a fast-forward or fast-reverse trick mode playback. Removing ten B pictures from this sequence would produce a playback three times as fast as normal playback and would still allow the shadow I pictures to be ignored. If a fast motion trick mode playback speed does excessively deviate from normal playback speed at decision block 229, then shadow I pictures should be used to decode the other pictures, as shown in step 230.

Moreover, for a less severe slow motion playback, the P pictures, instead of the shadow I pictures, can be used to decode the other pictures in the video signal read from the storage medium, as a relatively faster slow motion speed will not produce a significant decoding delay. For example, if twenty percent of each P picture contains I macroblocks and a reference picture can be created within approximately one-half second, then a slow motion playback of one-half the normal playback speed will increase the decoding delay to approximately one second. As such, the shadow I pictures can also be ignored during a relatively faster slow motion playback.

At step 232, during normal playback, or, alternatively, a less severe trick mode playback, a search can be conducted to locate the pictures contained in the modified first video segment. In one arrangement, the preprocessing engine 174 and the control CPU 122 of FIG. 1 can be used to locate the pictures. At step 234, if the control CPU 122 determines that a picture is a shadow I picture, then the shadow I picture will not be decoded and, as a result, will not be displayed during normal playback, as shown in step 236. If, however, the picture is not a shadow I picture, then such picture can be decoded and displayed in accordance with step 238.

Although the present invention has been described in conjunction with the embodiments disclosed herein, it should be understood that the foregoing description is intended to illustrate and not limit the scope of the invention as defined by the claims.

What is claimed is:

1. A method of recording onto a storage medium a video segment optimized for trick mode playback comprising the steps of:

receiving said video segment, wherein said video segment contains at least one predictive picture;

selectively forming at least one shadow intra picture from said at least one predictive picture; and inserting said at least one shadow intra picture into said video segment.

2. The method according to claim 1, wherein said video segment contains a first portion of video and a second portion of video and said second portion of video contains at least one introductory predictive picture.

3. The method according to claim 2, wherein said forming step further comprises the step of selectively decoding a predetermined number of said introductory predictive pictures in said second portion of video to obtain a properly decoded predictive picture.

4. The method according to claim 3, wherein a portion of each said introductory predictive picture contains intra macroblocks and said predetermined number is based in part on the amount of said intra macroblocks in each said introductory predictive picture.

5. The method according to claim 3, wherein said second portion of video contains at least one subsequent predictive picture and said forming step further comprises the steps of:
  selectively decoding said subsequent predictive pictures; and
  selectively re-encoding into shadow intra pictures predictive pictures selected from the group comprising said subsequent predictive pictures or said introductory predictive pictures.

6. The method according to claim 2, wherein said inserting step further comprises the step of inserting said at least one shadow intra picture into said first portion of video.

7. The method according to claim 1, further comprising the step of ignoring said at least one shadow intra picture during normal playback.

8. The method according to claim 1, further comprising the step of
  ignoring said at least one shadow intra picture during a moderate speed trick mode playback.

9. The method according to claim 1, wherein said video segment is an MPEG video segment that does not contain any conventional intra pictures.

10. The method according to claim 1, further comprising the step of modifying the number of bits contained in each said shadow intra picture inserted into said first portion of video.

11. The method according to claim 1, wherein said video segment is received from the group comprising a cable transmission, a satellite transmission or the Internet.

12. A system for recording onto a storage medium a video segment optimized for trick mode playback comprising:
  a receiver for receiving said video segment, wherein said video segment contains at least one predictive picture; and
  a video processor programmed to selectively form at least one shadow intra picture from said at least one predictive picture.

13. The system according to claim 12, wherein said video processor is further programmed to insert said at least one shadow intra picture into said video segment.

14. The system according to claim 13, wherein said video segment contains a first portion of video and a second portion of video and said second portion of video contains at least one introductory predictive picture.

15. The system according to claim 14, wherein said video processor is further programmed to selectively decode a predetermined number of said introductory predictive pictures in said second portion of video to obtain a properly decoded predictive picture.

16. The system according to claim 15, wherein a portion of each said introductory predictive picture contains intra macroblocks and said predetermined number is based in part on the amount of said intra macroblocks in each said introductory predictive picture.

17. The system according to claim 15, wherein said second portion of video contains at least one subsequent predictive picture and said video processor is further programmed to selectively decode said subsequent predictive pictures and selectively re-encode into shadow intra pictures predictive pictures selected from the group comprising said subsequent predictive pictures or said introductory predictive pictures.

18. The system according to claim 14, wherein said video processor is further programmed to insert said at least one shadow intra picture into said first portion of video.

19. The system according to claim 12, wherein said video processor is further programmed to ignore said at least one shadow intra picture during normal playback.

20. The system according to claim 12, wherein said video processor is further programmed to ignore said at least one shadow intra picture during a moderate speed trick mode playback.

21. The system according to claim 12, wherein said video segment is an MPEG video segment that does not contain any conventional intra pictures.

22. The system according to claim 12, wherein said video processor is further programmed to modify the number of bits contained in each said shadow intra picture inserted into said video segment.

23. The system according to claim 12, wherein said video segment is received from the group comprising a cable transmission, a satellite transmission or the Internet.

* * * * *